(12) United States Patent
Larsson et al.

(10) Patent No.: US 8,890,491 B2
(45) Date of Patent: Nov. 18, 2014

(54) HIGH VOLTAGE DC POWER SOURCE AND A POWER APPARATUS FOR A HIGH VOLTAGE ELECTRICAL POWER SYSTEM

(71) Applicants: Tomas Larsson, Vasteras (SE); Falah Hosini, Vasteras (SE)

(72) Inventors: Tomas Larsson, Vasteras (SE); Falah Hosini, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/945,709

(22) Filed: Jul. 18, 2013

(65) Prior Publication Data

US 2013/0300379 A1 Nov. 14, 2013

Related U.S. Application Data

(63) Continuation of application No. PCT/EP2011/050560, filed on Jan. 18, 2011.

(51) Int. Cl.
*H02J 7/00* (2006.01)
*H02J 3/36* (2006.01)

(52) U.S. Cl.
CPC ............... *H02J 7/0042* (2013.01); *Y02E 60/60* (2013.01); *H02J 7/0063* (2013.01); *H02J 3/36* (2013.01)
USPC .......................................... 320/166; 320/167

(58) Field of Classification Search
USPC .................................................. 320/166, 167
See application file for complete search history.

(56) References Cited

U.S. PATENT DOCUMENTS

| 6,628,572 | B1 * | 9/2003 | Yabe et al. ............... 368/204 |
| 6,838,923 | B2 * | 1/2005 | Pearson ................. 327/309 |
| 2003/0007369 | A1 | 1/2003 | Gilbreth et al. |
| 2005/0156566 | A1 | 7/2005 | Thorsoe et al. |
| 2008/0191662 | A1 * | 8/2008 | Nakanishi ............. 320/118 |
| 2009/0243540 | A1 * | 10/2009 | Choi et al. ............. 320/107 |

FOREIGN PATENT DOCUMENTS

| JP | 2004328826 A | 11/2004 |
| WO | 02080332 A1 | 10/2002 |
| WO | 2008002223 A1 | 1/2008 |
| WO | 2009152849 A1 | 12/2009 |

OTHER PUBLICATIONS

International Search Report and Written Opinion of the International Searching Authority Application No. PCT/EP2011/050560 Completed: May 9, 2011; Mailing Date: May 3, 2011 9 pages.

* cited by examiner

*Primary Examiner* — Yalkew Fantu
(74) *Attorney, Agent, or Firm* — St. Onge Steward Johnston & Reens LLC

(57) ABSTRACT

A high voltage dc power source for providing a charging current to an electronic device, including one or more strings connected in parallel, each string being subdivided into dc power source units connected in series and each string being provided with a solid-state switch configured to connect and disconnect the string, and a control unit adapted to turn on and turn off the solid-state switch, and the control unit is configured, upon receiving an order to connect the string, to control the switch of the string to be alternately turned on and off so that a soft charging of the electronic device is achieved.

11 Claims, 3 Drawing Sheets

US 8,890,491 B2

HIGH VOLTAGE DC POWER SOURCE AND A POWER APPARATUS FOR A HIGH VOLTAGE ELECTRICAL POWER SYSTEM

FIELD OF THE INVENTION

The present invention relates to a high voltage dc power source for providing a charging current to an electronic device. By a high voltage dc power source should be understood dc power source units connected in series to be within the range of 3 kV and upwards, preferably in the range of 10 kV and upwards. The invention further relates to a power apparatus for a high voltage electrical power system including a high voltage dc power source connected in parallel. With a power apparatus is meant an apparatus that is capable of controlling reactive power and/or active power. Examples of power apparatus are a power compensator and an uninterruptible power supply (UPS). High voltage electrical power systems can be networks for transmission or distribution of electrical energy as well as industries, hospitals and such.

BACKGROUND OF THE INVENTION

Within flexible alternating current transmission systems (FACTS) a plurality of control apparatus are known. One such FACTS apparatus is a static compensator (STATCOM). A STATCOM comprises a voltage source converter (VSC) having an AC side connected to a high voltage electrical power system and a DC side connected to a temporary electric power storage means such as capacitors. The STATCOM can supply reactive power to or absorb reactive power from the transmission line.

As opposed to the STATCOM, which only compensates for reactive power, another concept is to connect a dc power source to a STATCOM, and thus being able to perform active power compensation. Such a power apparatus may be used e.g. as a spinning reserve and for compensating for fluctuating energy levels in the power system.

Today the dc power source is a high voltage battery. Since the power apparatus is connected to the ac voltage of the high voltage electrical power system, a large number of battery cells have to be connected in series to match the dc voltage of the power apparatus. Moreover, to obtain a desired amount of electric energy (duration of active power) of the energy storage, a number of strings including a plurality of battery cells could be connected in parallel.

In WO/2009/152849 such a power apparatus comprising a voltage source converter and a high voltage dc power source is presented. The power apparatus further comprises solid-state switches which are distributed among the dc power-source units of the string and configured to disconnect the string in case of a fault. By providing each of the dc power source units along the string with a solid-state switch and turning the switches on and off simultaneously, each switch only has to withstand the voltage over its corresponding dc power source unit when the string is disconnected.

Restoring power after a wide-area power outage is a difficult task. A plurality of power stations needs to be brought back on-line. Normally, this is done with the help of power from the rest of the grid. In the absence of grid power, a so-called black start needs to be performed to boot strap the power grid into operation. To provide a black start, some power stations are typically equipped with small diesel generators which can be used to start larger generators, which in turn can be used to start the main power station generators. Generating plants using steam turbines require station service power of up to 10% of their capacity for boiler feedwater pumps, boiler forced-draft combustion air blowers, and for fuel preparation. It is, however, uneconomical to provide such a large standby capacity at each station, so black-start power must be provided over the electrical transmission network from other stations.

An advantage with the power apparatus comprising battery energy storage systems as described above is their ability to provide power to the grid to which it is connected in case of a wide-area power outage making it possible to provide a black start of the grid. In WO/2008/002223 a power compensator is disclosed comprising a voltage source converter, a dc link capacitor and an energy storage device further comprising a high voltage battery, a first and second main switch for disconnecting the battery from the capacitor. One of the switches disconnects the string from the positive dc rail of the converter and the other switch disconnects the string from the negative dc rail of the converter. Each of the switches has to be rated for the entire converter voltage to be capable of protecting the power apparatus. In parallel with the main switches there are arranged a first and a second parallel path containing a resistor means and a secondary switch. The power compensator also comprises a control means for controlling the switches. Further, a method for providing a black start of a dead network is proposed. The method comprises the method steps of:
 energizing the dc link capacitor from the energy storage device;
 start switching the voltage source converter; and
 controlling the power flow of the power compensator to and from the network in dependence on the balance of power producers and power consumers connected to the network.

However, connecting the energy storage directly to the dc link capacitor would lead to a large inrush current that might result in mechanical or electrical damage to the battery energy storage system and/or converter. It might also lead to a triggering of a short circuit detection system of the power apparatus and consequently a shut down order of the power apparatus. In the method disclosed in WO/2008/002223 and described above this problem is solved by forming a current path containing resistor means in order to decrease the current flow between the dc link capacitor and the energy storage device. However, the resistors are expensive, space requiring, non-controllable and run the risk of becoming overheated.

SUMMARY OF THE INVENTION

It is an object of the invention to overcome or at least alleviate the above-mentioned problem with large inrush currents. In particular, it is an object of the invention to provide an improved high voltage dc power source which reduces the large inrush current in a way that is more controllable, less expensive and less space requiring.

According to one aspect of the invention this object is achieved by a high voltage dc power source.

The high voltage dc power source for providing a charging current to an electronic device according to the invention is characterized in that a control unit is configured, upon receiving an order to connect a string, to control at least one switch of the string to be alternately turned on and off so that a soft charging of the electronic device is achieved. For example a Pulse Width Modulation (PWM) scheme could be used.

An advantage with the high voltage dc power source according to the invention is that by controlling the at least one solid-state switch of the string to be alternately turned on and off a soft and more controllable charging of the electronic device is achieved. Additionally, no resistor means are needed which provides a less expensive and less space requiring dc power source. Furthermore, no secondary switches are needed as the same current path is used for the charging current as well as for the operating current owing to the fact that the at least one solid-state switch is used for connecting and disconnecting the string as well as a means for controlling the inrush current.

With a dc power source unit is meant a plurality of small dc power source members connected in series and/or parallel and capable of providing dc power, such as a battery cell, a photovoltaic cell, a fuel cell, or a super capacitor. Different types of dc power source members could also be combined in the high voltage dc power source.

In an embodiment of the invention, each string is provided with a plurality of solid-state switches configured to connect and disconnect said string, each switch is arranged to connect and disconnect one of the dc power source units of the string and the control unit is configured to simultaneously control the solid-state switches of the string to be alternately turned on and off so that a soft charging of the electronic device is achieved. The use of a plurality of solid-state switches as mentioned above is necessary at certain voltage levels of the dc power source since there are no solid-state switches available on the market with such voltage ratings. A further advantage is that the plurality of solid-state switches implies a lower voltage across each switch and accordingly smaller and less expensive switches having lower voltage ratings can be used.

In an embodiment of the invention, the control unit is configured to vary the time interval between the turn on and the turn off or the time interval between the turn off and the turn on of the switch to limit the charging current until a predetermined voltage value across said electronic device is achieved. Advantageously, varying the time interval between the turn on and the turn off or the time interval between the turn off and the turn on of the switch makes it possible to arbitrarily control the magnitude of the charging current to the electronic device.

In an embodiment of the invention, the control unit is configured to gradually increase the time interval between the turn on and the turn off of the switch. For instance, when the voltage difference between the charging string (or strings) and the electronic device decreases as the electronic device is charged, the control unit is able to gradually increase the time interval between the turn on and the turn off of the switch, thereby advantageously accelerating the charging process of the electronic device without exceeding a harmful level of the charging current.

In an embodiment of the invention, the control unit is configured to gradually decrease the time interval between the turn off and the turn on of the switch.

In an embodiment of the invention, the control unit is adapted to determine said time interval based on measured values of said charging current. Measuring the charging current makes it possible to automatically adapt the time interval between the turn on and the turn off of the switch based on current values of the charging current, thereby optimising the control of the charging current.

In an embodiment of the invention, the control unit is configured to control the at least one switch according to a predefined switching pattern. An advantage with a predefined switching pattern is that the charging current does not have to be measured and consequently no charging current sensors are needed.

In an embodiment of the invention, the dc power source has two or more parallel strings and the control unit is configured to control the at least one switch of the string having highest voltage to be alternately turned on and off so that a soft charging of one of the other strings having lower voltage is achieved. For different reasons the voltage across a string of dc power source units can differ in relation to another string or strings. For example, in cases where the string has been temporarily disconnected for replacement of dc power source units or where the string includes batteries with a different State Of Charge (SOC) value due to aging of some of the battery cells in the string. In such cases it is an advantage to be able to control the charging current from the string having the highest voltage level to the string having the lowest voltage level.

In an embodiment, each dc power source unit provides dc voltage at 1-10 kV, preferably between 2 and 5 kV or approximately 3 kV. The high voltage dc power source can be dimensioned for voltages between 10 kV and 100 kV, or even more than 100 kV.

According to a second aspect of the invention this object is achieved by a power apparatus for a high voltage electrical power system, the power apparatus comprising a voltage source converter having a dc link capacitor connected in parallel and a high voltage dc power source according to any of the previously mentioned embodiments. The control unit of the high voltage dc power source is configured, upon receiving the order to connect the one or more strings, to control the at least one switch of the string to be alternately turned on and off so that a soft charging of the dc link capacitor or one of its other strings is achieved.

According to a third aspect of the invention this object is achieved by use of the high voltage dc power source according to any of the previously mentioned embodiments, for charging a dc link capacitor in a power apparatus.

Another alternative is the use of the high voltage dc power source according to any of the previously mentioned embodiments, for charging a STATCOM with battery energy storage.

A further alternative is the use of the high voltage dc power source for equalising the voltage of said parallel strings.

BRIEF DESCRIPTION OF THE DRAWINGS

The present invention will be more fully described by way of example with reference to the accompanying drawings in which.

DETAILED DESCRIPTION OF THE INVENTION

Figure 1:
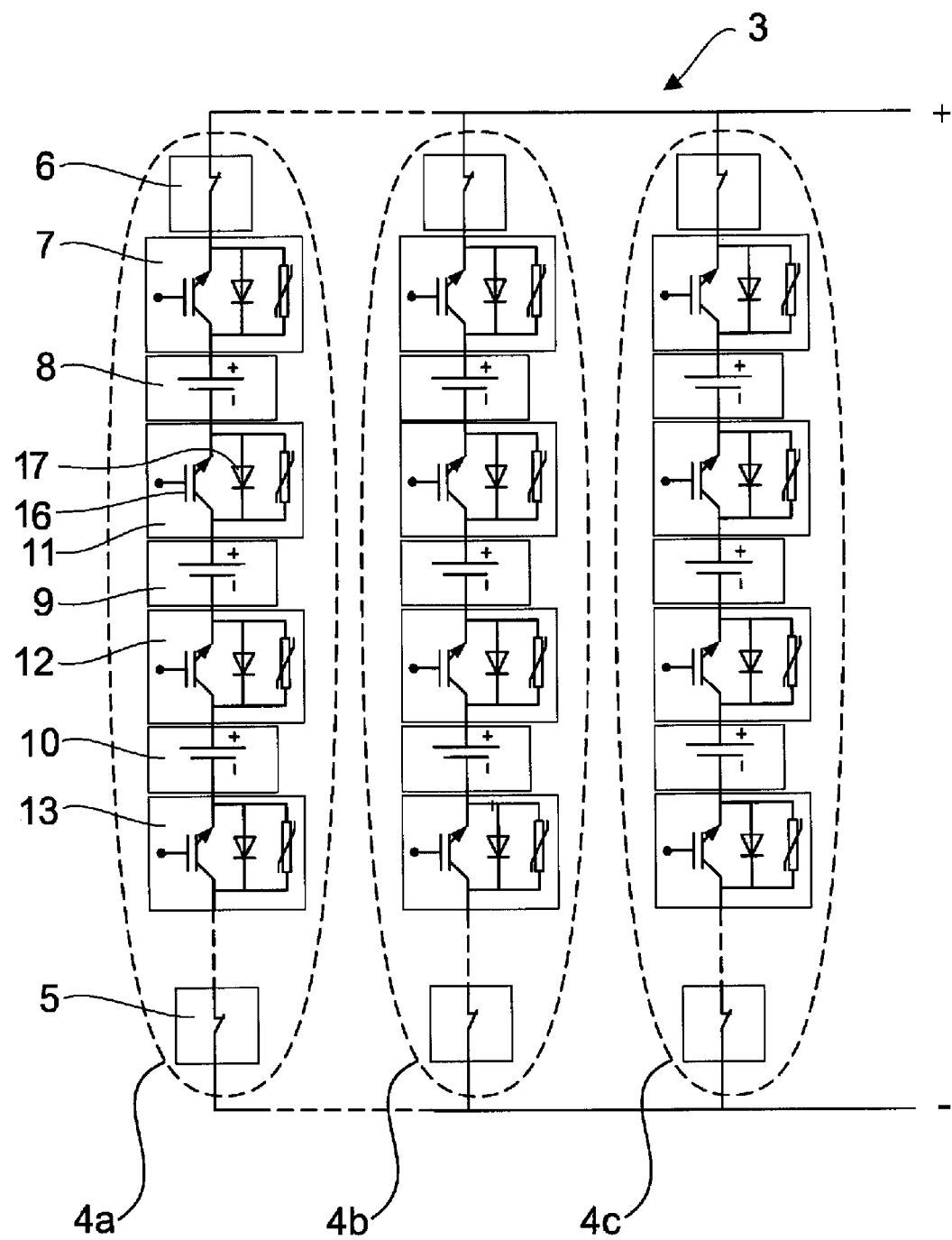
FIG. 1 shows a high voltage dc power source in accordance with prior art.

FIG. 1 shows a high voltage dc power source 3 according to prior art. The high voltage dc power source 3 is in the following denoted dc power source. The same reference numerals are used throughout the figures for same or corresponding parts.

The dc power source 3 comprises one or more strings connected in parallel, depending on the desired amount of active power. In the example illustrated in FIG. 1, three strings are shown 4a-c. Each string 4a-c is subdivided into a plurality of dc power source units 8-10 connected in series. The dc power source units 8-10 in turn comprise a plurality of battery cells (not shown in FIG. 1) connected in series and/or parallel.

Each dc power source unit 8-10 is provided with a solid-state switch 11-13, in the following denoted a switch. Each string further includes an extra switch 7 to be able to completely disconnect the dc power source. The switches 7, 11-13 are configured to connect and disconnect the corresponding dc power source units 8-10 in case of a fault, for example a short-circuit. All switches 7, 11-13 in the string are arranged so that they are turned on and off simultaneously, implying that each switch 7, 11-13 only has to withstand their corresponding part of a total voltage across the dc power source when the string 4*a-c* is disconnected. The voltage of the dc power source units 8-10 is adapted to the breaking capability of the switches 7, 11-13.

Each switch 7, 11-13 comprises a controllable semiconductor, such as a transistor 16, and a rectifying member, such as a diode 17, which is connected in anti-parallel with the transistor 16. Disconnectors 5, 6 are placed in the strings for security reasons for instance during labour on the dc power source.

Figure 2:
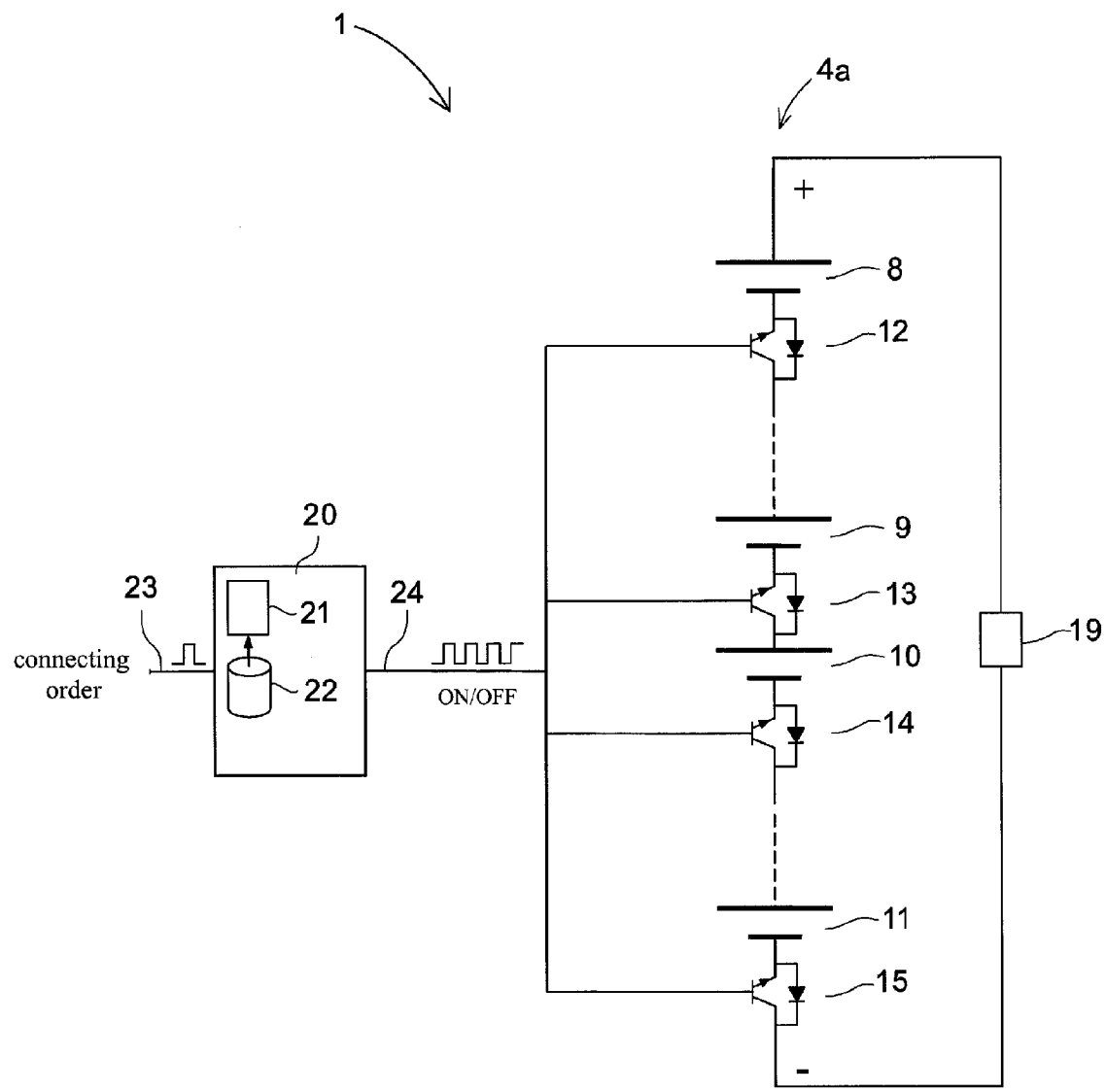
FIG. 2 shows a schematic figure of an embodiment of a high voltage dc power source in accordance with the present invention.

FIG. 2 illustrates an example of a high voltage dc power source 1 according to the present invention. The high voltage dc power source 1, in the following denoted dc power source 1 comprises one or more strings 4*a-c* connected in parallel, each string being subdivided into a plurality of dc power source units 8-11 connected in series. In FIG. 2 only one string is shown. The number of dc power source units 8-11 in series connection depends on the desired voltage level of the dc power source 1. Each string 4*a-c* is provided with at least one solid-state switch 12-15 configured to connect and disconnect the string. In FIG. 2 four switches 12-15 and four dc power source units 8-11 are shown. It is however possible to decrease the number of switches in each string as long as the breaking capability of the switch or switches is/are sufficient to disconnect the string. The dc power source 1 further comprises a control unit to turn on and off the switches. The control unit comprises one or more string control units 20, one for each string 4*a-c* in the dc power source 1. Since only one string is shown in FIG. 2 only one string control unit is shown. The string control unit controls the turn on and the turn off of the switches in its corresponding string.

The string control unit 20 is configured, upon receiving a connecting order 23 from a main controller (not shown in FIG. 2) to connect the string 4*a-c* and thereby initiating a charging current. The string control unit 20 includes among other things suitable processing means, such as a Central Processing Unit. According to the invention the string control unit 20 further includes a soft start module 21 configured to simultaneously control the switches 12-15 of the string to be alternately turned on and off so that a soft charging of an electronic device 19 connected in parallel with the string is achieved. The string control unit 20 is configured to execute the soft start module 21 upon receiving the connecting order 23. The electronic device 19 comprises for example a dc link capacitor in a power apparatus or another string in the dc power source 1. In the latter case the high voltage dc power source 1 can be used for equalising a voltage difference between parallel strings.

In a first embodiment of the invention the string control unit comprises a memory storage 22 for storing predefined switching patterns. When the string control unit 20 receives an order to connect the string, the soft start module 21 will retrieve a predefined switching pattern from the memory storage 22, and simultaneously control the switches of the string to be alternately turned on and off in accordance with the predefined switching pattern. The soft start module 21 is configured to generate a control signal 24 based on the switching pattern and the string control unit is configured to send the control signal 24 to each switch in the string. The switching patterns define the time intervals between turning the switches on and off and between turning the switches off and on and is determined during the design phase of the dc power source based on circuit parameters such as loop inductance, voltage level of the dc power source etc. As soon as the switches have been turned on the charging current through the string will start to increase. The switches are a short moment later turned off in accordance with the predefined switching pattern in order for the current to decrease below a second threshold value before the switches are turned on again. This procedure is repeated in accordance with the predefined switching pattern until a predetermined voltage value across the electronic device is achieved.

In a second embodiment the switching pattern is not based on a predefined switching pattern but on measurements of the charging current. The string control unit will receive measurement values of the charging current in the string from a current measuring device not shown in FIG. 2. When the charging current has reached a first threshold value the switches are turned off in order for the current to decrease below the second threshold value before the switches are turned on again. This procedure will be repeated until the predetermined voltage value across the electronic device is achieved. At that time the charging current will not be able to reach above the first threshold value and the string will remain connected.

Figure 3A:
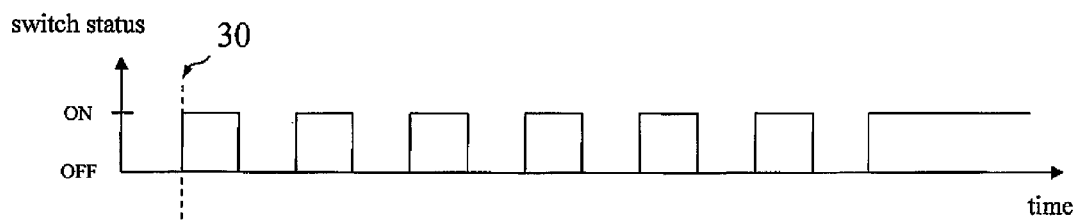
FIGS. 3A-C show three examples of switching patterns, turning the at least one switch of the string alternately on and off.
Figure 3B:
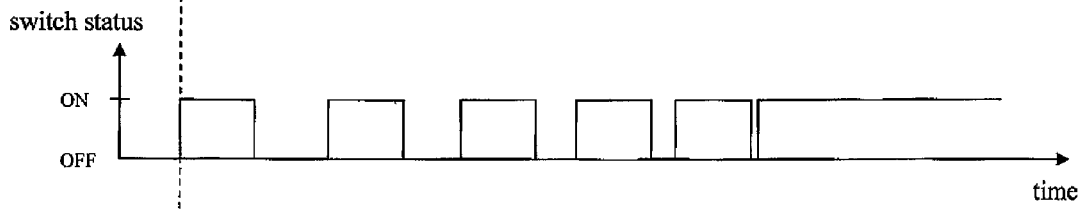
Figure 3C:
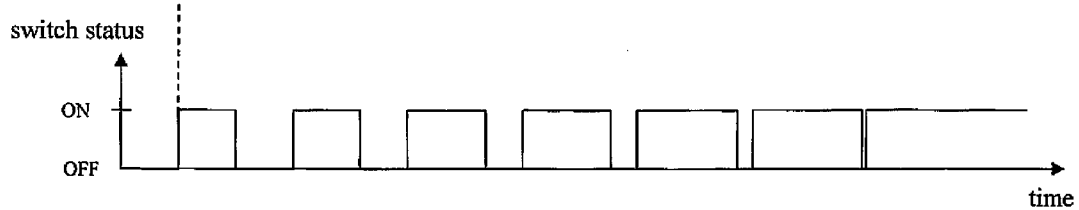

FIG. 3*a-c* shows three schematical examples of switching patterns, turning the switches in the string alternately on and off. The switching patterns could be predefined but could also be a result of measured values of the charging current as described above. On the x-axis of the diagram in FIG. 3*a-c* is shown the time instants at which the switches in the string are being simultaneously turned on and off during the soft charging of the electronic device. A dotted line 30 shows the time instant where the switches are being turned on for the first time after the connection order has been sent to the string control unit. On the y-axis of the diagram is shown the current switch status of the switches in the string being either ON or OFF. When the predetermined voltage value across the electronic device has been achieved, the switches will remain in the ON status during the operation of the dc power source. In the diagram in FIG. 3*a* a switching pattern is shown where the time intervals between the turn on and the turn off (switch status ON) and the time interval between the turn off and the turn on (switch status OFF) of the switch remains constant through the charging process.

How fast the charging current increases depends on the difference between the voltage value across the string and the voltage value across the electronic device and the loop inductance. In the beginning of this charging process the difference is at its highest level and accordingly, the charging current will reach the predefined threshold value much faster than at the end of the charging process. Consequently, in order to increase the speed of the charging process the time interval when the switches are in the ON status has to increase and this object is achieved with the switching patterns shown in FIGS. 3*b* and 3*c*. In the switching pattern shown in FIG. 3*b* the time interval between the turn on and the turn off remains constant through the charging process, but the switches are turned on more frequent i.e. the switching frequency is increased. In the switching pattern shown in FIG. 3*c* the frequency remains constant but the time interval between the turn on and the turn off is increased.

Figure 3D:
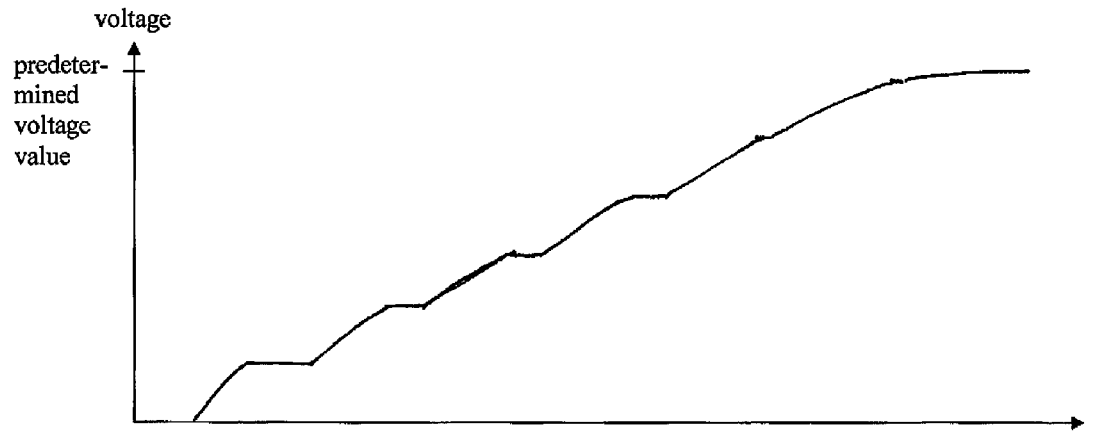
FIG. 3D shows an example of a corresponding increase of voltage across an electronic device.

In FIG. 3d is shown the voltage value across the electronic device 19 using the switching pattern shown in FIG. 3c as the voltage increases until the predetermined voltage value has been achieved.

What is claimed is:

1. A high voltage dc power source for providing a charging current to an electronic device, comprising:
   one or more strings connected in parallel, each string being subdivided into a plurality of dc power source units connected in series and each string being provided with a plurality of solid-state switches configured to connect and disconnect said string, and
   a control unit adapted to turn on and turn off the solid state switches, the control unit, upon receiving an order to connect the string, controls the solid state switches of the string to be alternately turned on and off so that a soft charging of the electronic device is achieved,
   wherein each switch is arranged to connect and disconnect one of the dc power source units of the string and that the control unit is configured to simultaneously control the solid state switches of the string to be alternately turned on and off so that the soft charging of the electronic device is achieved.

2. The high voltage dc power source according to claim 1, wherein the control unit is configured to vary the time interval between the turn on and the turn off or the time interval between the turn off and the turn on of each switch to limit the charging current until a predetermined voltage value across said electronic device is achieved.

3. The high voltage dc power source according to claim 2, wherein the control unit is configured to gradually increase the time interval between the turn on and the turn off of each switch.

4. The high voltage dc power source according to claim 2, wherein the control unit is configured to gradually decrease the time interval between the turn off and the turn on of each switch.

5. The high voltage dc power source according to claim 2, wherein the control unit is adapted to determine said time interval based on measured values of said charging current.

6. The high voltage dc power source according to claim 1, wherein the control unit is configured to control the solid state switches according to a predefined switching pattern.

7. The high voltage dc power source according to claim 1, wherein the dc power source has two or more parallel strings and the control unit is configured to control the solid state switches of the string having highest voltage to be alternately turned on and off so that a soft charging of one of the other strings having lower voltage is achieved.

8. A power apparatus for a high voltage electrical power system, the power apparatus comprising a voltage source converter having a dc link capacitor connected in parallel and a high voltage dc power source according to claim 1.

9. Use of a high voltage dc power source for charging a dc link capacitor in a power apparatus, comprising:
   one or more strings connected in parallel, each string being subdivided into a plurality of dc power source units connected in series and each string being provided with a plurality of solid-state switches configured to connect and disconnect said string, and
   a control unit adapted to turn on and turn off the solid state switches, the control unit, upon receiving an order to connect the string, controls the solid state switches of the string to be alternately turned on and off so that a soft charging of the electronic device is achieved,
   wherein, each switch is arranged to connect and disconnect one of the dc power source units of the string and that the control unit is configured to simultaneously control the solid state switches of the string to be alternately turned on and off so that the soft charging of the electronic device is achieved.

10. Use of a high voltage dc power source for charging a STATCOM with battery energy storage, comprising:
   one or more strings connected in parallel, each string being subdivided into a plurality of dc power source units connected in series and each string being provided with a plurality of solid-state switches configured to connect and disconnect said string, and
   a control unit adapted to turn on and turn off the solid state switches, the control unit, upon receiving an order to connect the string, controls the solid state switches of the string to be alternately turned on and off so that a soft charging of the electronic device is achieved,
   wherein, each switch is arranged to connect and disconnect one of the dc power source units of the string and that the control unit is configured to simultaneously control the solid state switches of the string to be alternately turned on and off so that the soft charging of the electronic device is achieved.

11. Use of a high voltage dc power source for equalising the voltage of parallel strings, comprising:
   one or more strings connected in parallel, each string being subdivided into a plurality of dc power source units connected in series and each string being provided with a plurality of solid-state switches configured to connect and disconnect said string, and
   a control unit adapted to turn on and turn off the solid state switches, the control unit, upon receiving an order to connect the string, controls the solid state switches of the string to be alternately turned on and off so that a soft charging of the electronic device is achieved,
   wherein, each switch is arranged to connect and disconnect one of the dc power source units of the string and that the control unit is configured to simultaneously control the solid state switches of the string to be alternately turned on and off so that the soft charging of the electronic device is achieved, and
   wherein the dc power source has two or more parallel strings and the control unit is configured to control the switches of the string having highest voltage to be alternately turned on and off so that the soft charging of one of the other strings having lower voltage is achieved.

* * * * *